US 6,616,479 B1

(12) United States Patent
Jones

(10) Patent No.: US 6,616,479 B1
(45) Date of Patent: Sep. 9, 2003

(54) RETENTION DEVICE FOR SEPARABLE CONNECTION

(75) Inventor: Dennis B. Jones, Orange, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/095,416

(22) Filed: Mar. 8, 2002

(51) Int. Cl.[7] .............................................. H01R 13/60
(52) U.S. Cl. ......................... 439/567; 439/555; 411/48
(58) Field of Search ................................. 439/567, 555, 439/564, 573; 411/46, 48, 45, 41, 508, 509, 510; 174/138 D

(56) References Cited

U.S. PATENT DOCUMENTS

| | | | | |
|---|---|---|---|---|
| 2,941,439 A | * | 6/1960 | Rapata | 411/41 |
| 3,671,920 A | * | 6/1972 | Iantorno et al. | 439/550 |
| 4,405,272 A | * | 9/1983 | Wollar | 411/41 |
| 4,952,106 A | * | 8/1990 | Kubogochi et al. | 411/48 |
| 5,044,985 A | * | 9/1991 | Sheen | 439/544 |
| 5,108,308 A | * | 4/1992 | Northcraft et al. | 439/555 |
| 5,163,795 A | * | 11/1992 | Benoit et al. | 411/45 |
| 5,775,860 A | * | 7/1998 | Meyer | 411/46 |
| 6,287,142 B1 | * | 9/2001 | Sawayanagi et al. | 439/537 |
| 6,457,986 B2 | * | 10/2002 | Hirata | 439/342 |

* cited by examiner

Primary Examiner—Tho D. Ta
Assistant Examiner—James R. Harvey
(74) Attorney, Agent, or Firm—Wei Te Chung

(57) ABSTRACT

A retention device (1) for separable connection of the present invention includes a first member (10) and a second member (12) engageable with each other. The first member includes a base portion (14) and at least two elastic latches (16) extending from the base portion for inserting into a hole (54, 56) defined in boards (50, 52) to which the retention device is fastened. Each elastic latch has a hook (17) for engaging with bottom face of one of the boards. The base portion of the first member defines an opening (20) in which the second member is received. The second member includes at least two wedge portions (28) which, when the second member is pushed into the opening of the second member, drive the at least two elastic latches to move inwardly, thereby disengaging the hooks of the first member from the boards.

12 Claims, 8 Drawing Sheets

RETENTION DEVICE FOR SEPARABLE CONNECTION

BACKGROUND OF THE INVENTION

1. Field of the Invention

The present invention relates to a retention device, and particularly to a retention device for a separable connection, in which the retention device when unfastened is removeable from elements that it holds together.

2. Description of the Related Art

Retention devices are widely used as connection means for joining one element to another. These retention devices generally include two sorts: retention devices for permanent connection and retention devices for separable connection. The retention devices for permanent connection are used to join two or more elements together that once the join is established, these elements cannot be separated from each other unless the retention devices are destroyed. So, the retention devices for permanent connection are not recyclable. The retention devices for separable connection are used to join two or more elements that are separable from each other by just deforming the retention devices and the deformation is recoverable. So, separable connection retention devices are recyclable.

U.S. Pat. No. 6,327,147, issued to Intel Corporation in Dec. 4, 2001, U.S. Pat. No. 6,244,4875, issued to Hon Hai Precision Ind. Co., Ltd., in Jun. 12, 2001, U.S. Pat. No. 6,031,715, issued to Micron Electronics, Inc., in Feb. 29, 2000 and U.S. Pat. No. 6,074,231, issued in Jun. 13, 2000 each disclose a retention device for separable connection. These retention devices each include a pair of elastic latches with hooks at free ends thereof and a post movably located between the pair of elastic latches. When the post is pulled upwardly to be away from the pair of elastic latches, the latches are deformable to be inserted into a hole in a board to which the retention device is fastened. Then the post is inserted between the elastic latches to expand the elastic latches so that the hooks of the elastic latches engage with the board.

A primary disadvantage of these retention devices for separable connection is the difficulty of releasing these retention devices from the board. Since these retention devices do not themselves have means for releasing the elastic latches from the board, external tools are required. This is inconvenient in operation. Hence, an improved retention device for separable connection is required to overcome the disadvantages of the prior art.

SUMMARY OF THE INVENTION

An objective of the present invention is to provide a retention device for separable connection which has means for conveniently disengaging the retention device from an element to which the retention device is fastened.

To fulfill the above objective, a retention device for separable connection of the present invention includes a first member and a second member engageable with each other. The first member includes a base portion and at least two elastic latches extending from the base portion for inserting into holes defined in boards to which the retention device is fastened. Each elastic latch has a hook at a free end thereof for engaging with one of the boards. The base portion of the first member defines an opening that the second member is partially received in. The second member includes at least two wedge portions which, when the second member is pushed into the opening of the second member, drive the at least two elastic latches to move inwardly, thereby disengaging the hooks of the first member from the boards.

In a further aspect of this invention, the second member includes a body portion, a button at one end of the body portion and the wedge portions at an opposite end of the body portion. The body portion provides four hooks at the end thereof away from the button and defines two notches at opposite sides of each hook. The base portion of the first member correspondingly provides four channels with slanted surfaces for insertion of the hooks of the second member and eight keys respectively received in the corresponding notches of the body portion of the second member. The first member further includes two wings extending from the base portion in a direction away from the elastic latches by which the retention device for separable connection is pulled out from the holes of the boards.

Other objectives, advantages and novel features of the invention will become more apparent from the following detailed description of the present embodiment when taken in conjunction with the accompanying drawings.

DESCRIPTION OF THE PREFERRED EMBODIMENT

Figure 1:
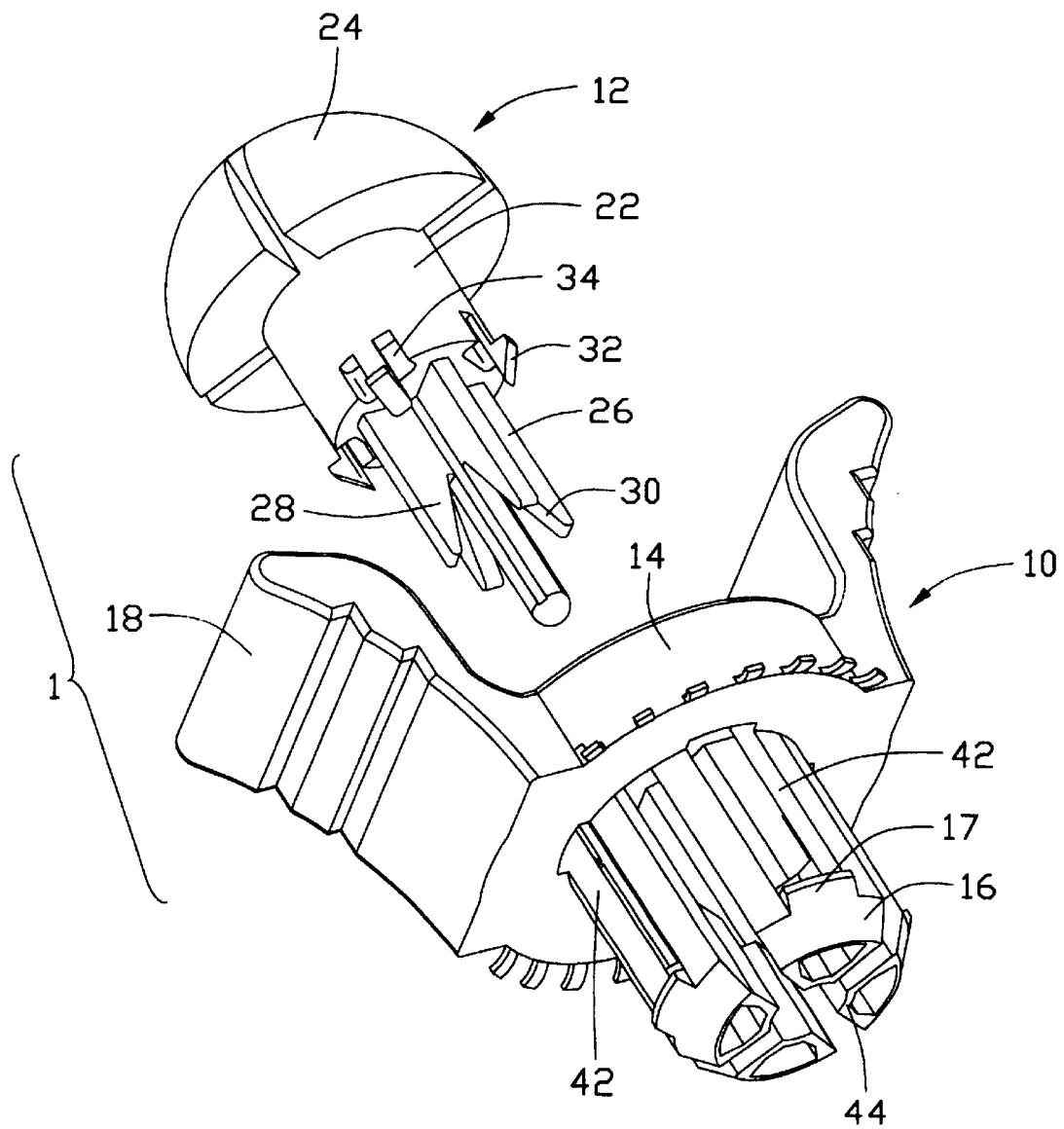
FIG. 1 is an exploded perspective view of a retention device in accordance with the present invention.
Figure 2:
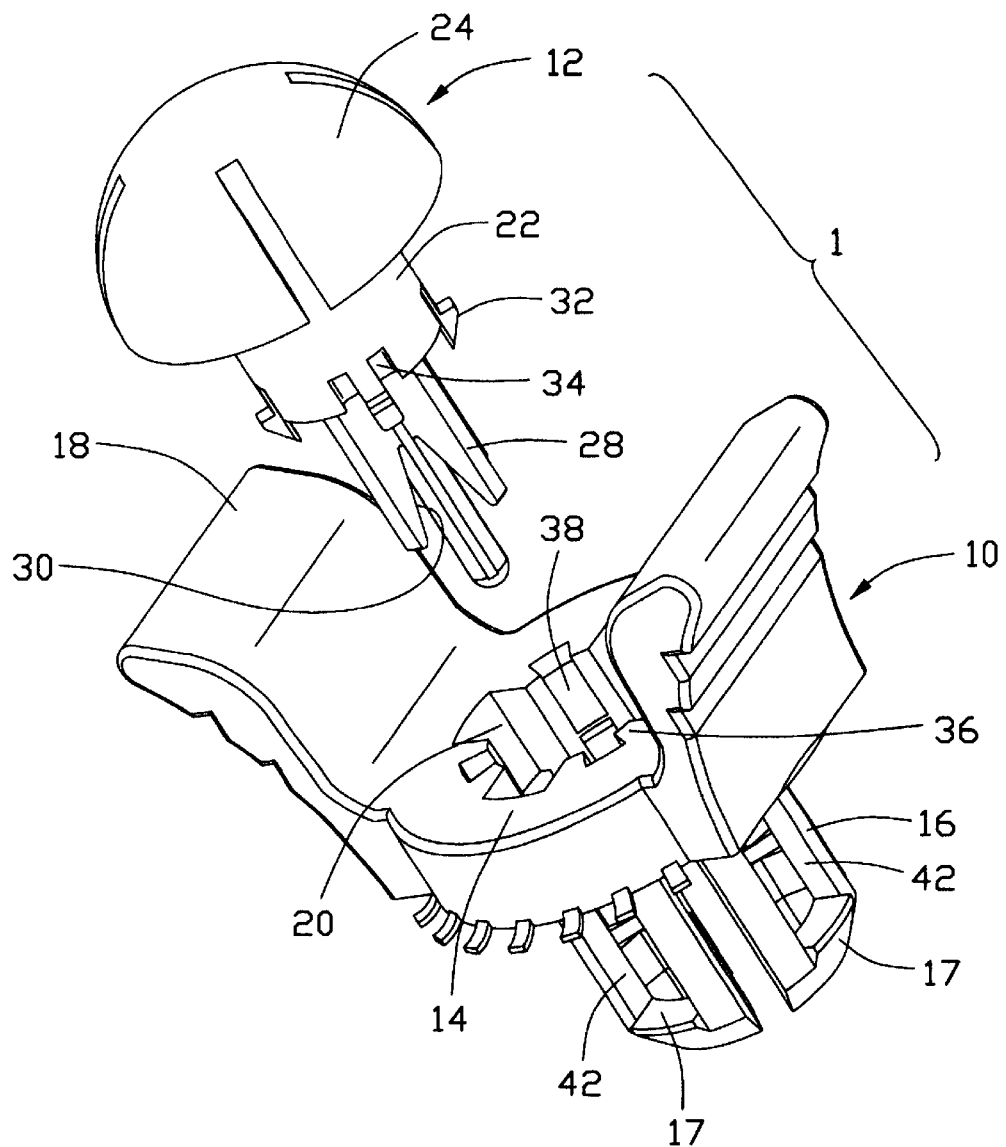
FIG. 2 is similar to FIG. 1 but viewed from an opposite aspect.
Figure 3:
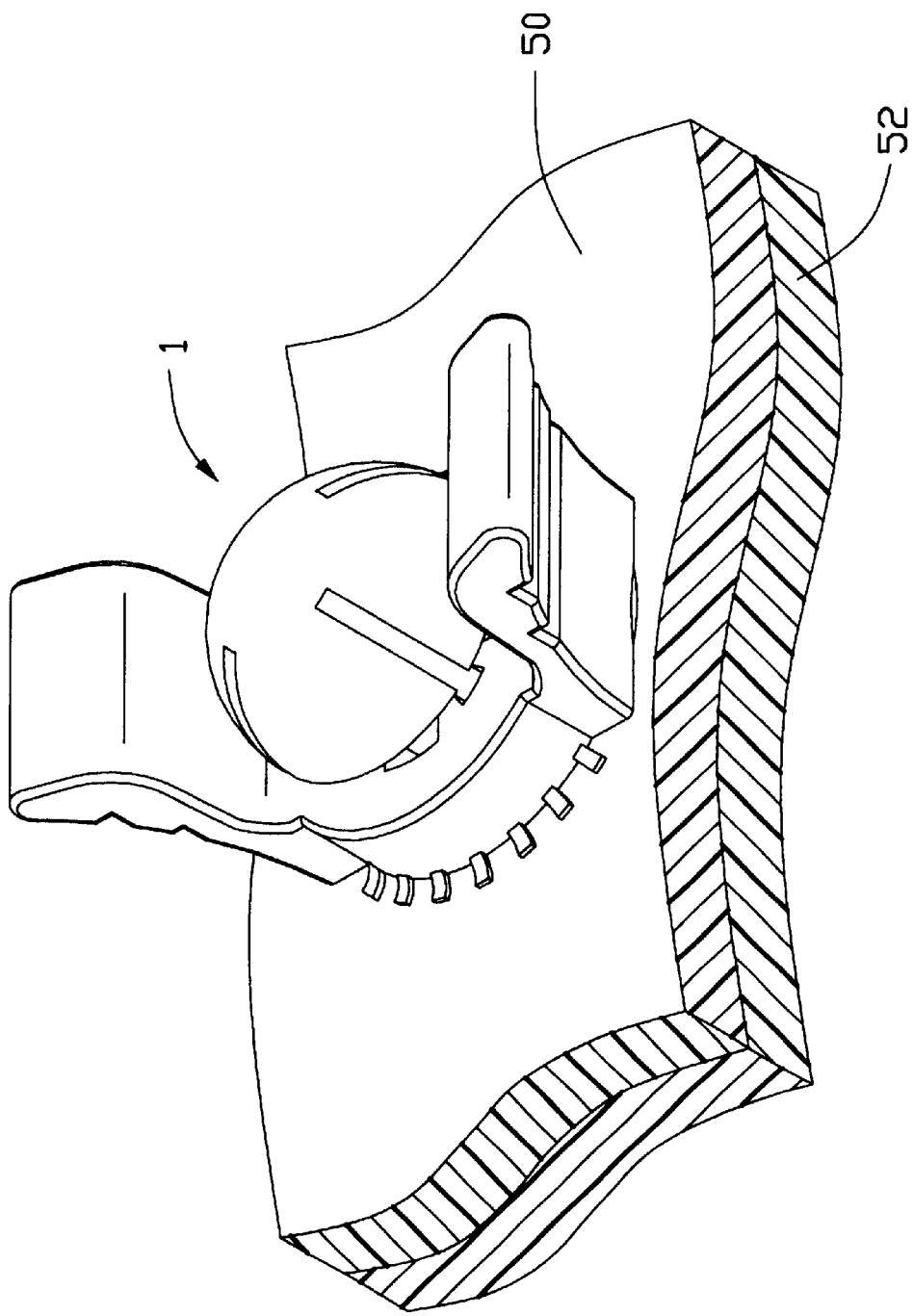
FIG. 3 is a perspective view showing the retention device of the present invention fastening two boards together.
Figure 4:
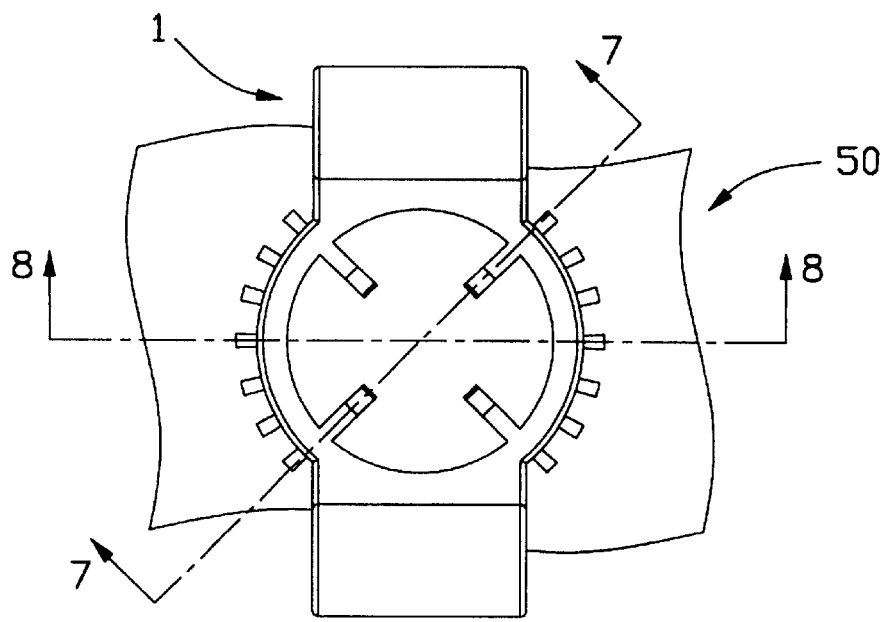
FIG. 4 is a top planar view of FIG. 3.
Figure 5:
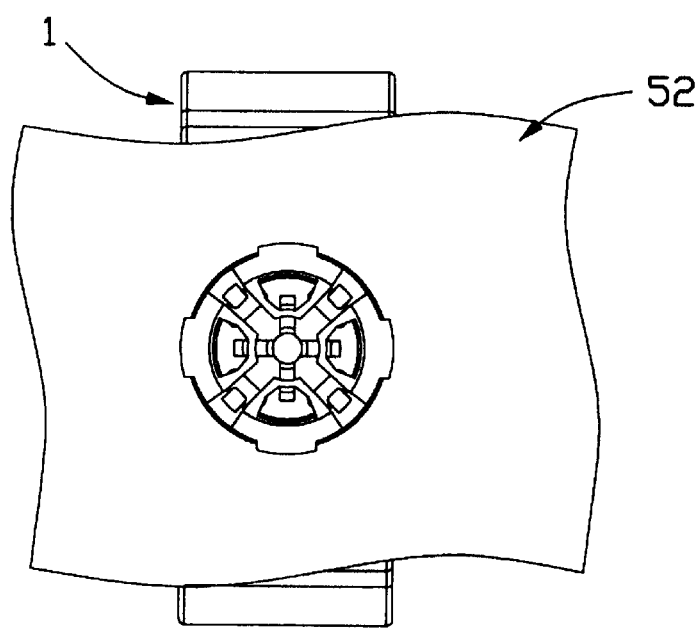
FIG. 5 is a bottom planar view of FIG. 4.
Figure 6:
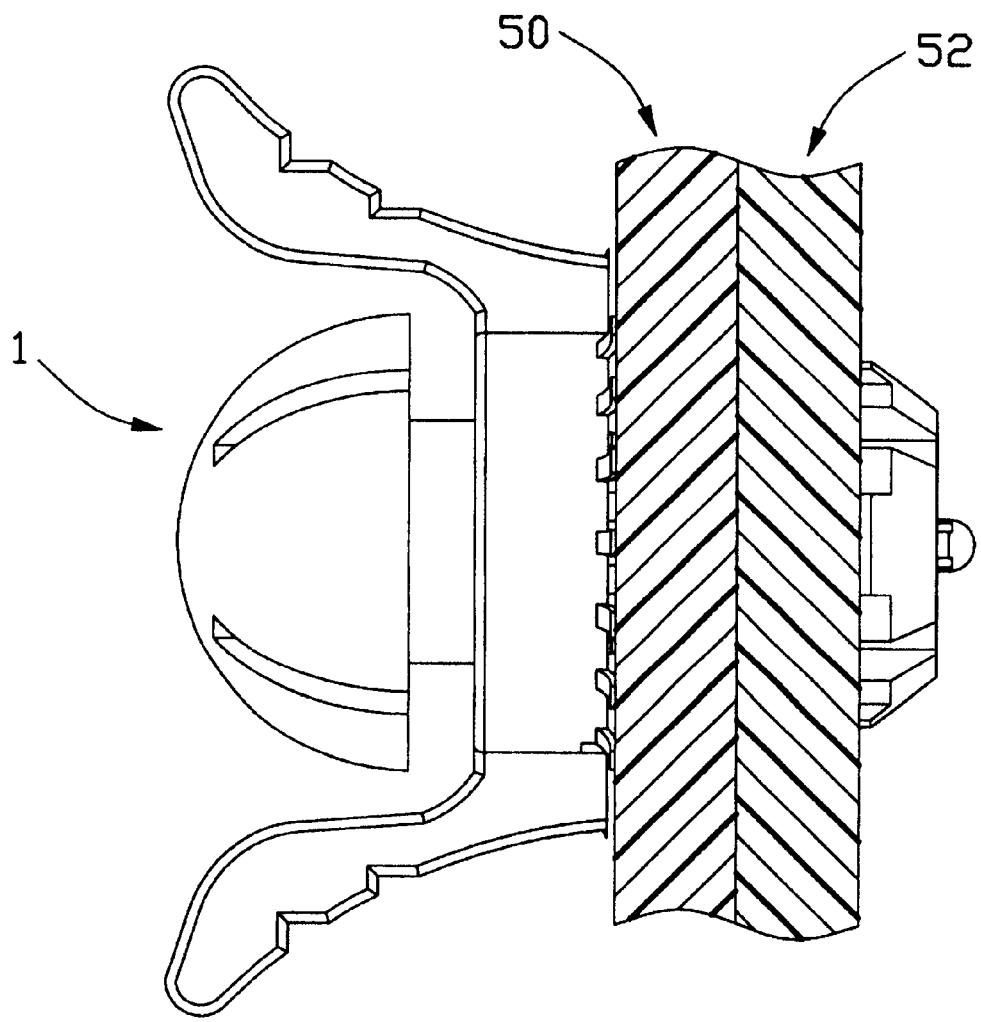
FIG. 6 is a side planar view of FIG. 4.

Referring to FIGS. 1 and 2, a retention device 1 for separable connection in accordance with the present invention comprises a first member 10 and a second member 12 moveably engaging with the first member 10. The first member 10 includes a base portion 14, a number of (four in this embodiment) elastic latches 16 downwardly extending from the base portion 14 with hooks 17 formed at free ends thereof for engaging with element to which the retention device 1 is fastened to (described in detail later), and two wings 18 upwardly and laterally extending from the base portion 14 for pulling the retention device 1 out of the element when the elastic latches 16 disengage from the element. The base portion 14 defines an opening 20 so that the second member 12 can be partially inserted therein. The second member 12 includes a body portion 22, a button 24 at one end of the body portion 22 on which external force is exerted to push the second member 12 further into the opening 20 of the first member 10 and a number of (four in this embodiment) branches 26 extending from an opposite end of the body portion 22 for driving the elastic latches 16 to move inwardly when the second member 12 is inserted into the first member 10. The branches 26 are located in accordance with the elastic latches 16 and each branch 26 forms a wedge portion 28 at a lower end thereof. The wedge 28 includes an inclined surface 30 at an inner side thereof.

The body portion 22 further includes a number of (four in this embodiment) hooks 32 extending therefrom in a direction away from the button 24 for engaging with the base portion 14 of the first member 10. The body portion 22 again defines two notches 34 adjacent two sides of each hook 32 and the base portion 14 of the first member 10 provides a number of pairs of keys 36 each being located in accordance with corresponding notches 34 of the body portion 22 of the second member 12 so that when the second member 12 is inserted into the first member 10, the branches 26 are extended into the elastic latches 16, respectively, and two neighboring keys 36 are extended into two corresponding notches 34. A channel 38 is defined between each pair of keys 36 and positioned in accordance with a corresponding hook 32 of the second member 12. Each channel 38 includes a slanted surface 40 (FIG. 7) for facilitating insertion of the hooks 32 through the opening 20. Each elastic latch 16 defines a slot 42 for improving the elasticity thereof. Each elastic latch 16 has an inner portion 44 for engaging with the inclined surface 30 of a corresponding wedge portion 28 when the second member 12 is inserted into the first member 10, whereby the elastic latches 16 are driven to move inwardly by the branches 26. The inward movement of the elastic latches 16 causes the retention device 1 to disengage from the element to which the retention device 1 is fastened (FIGS. 8 and 9).

Figure 7:
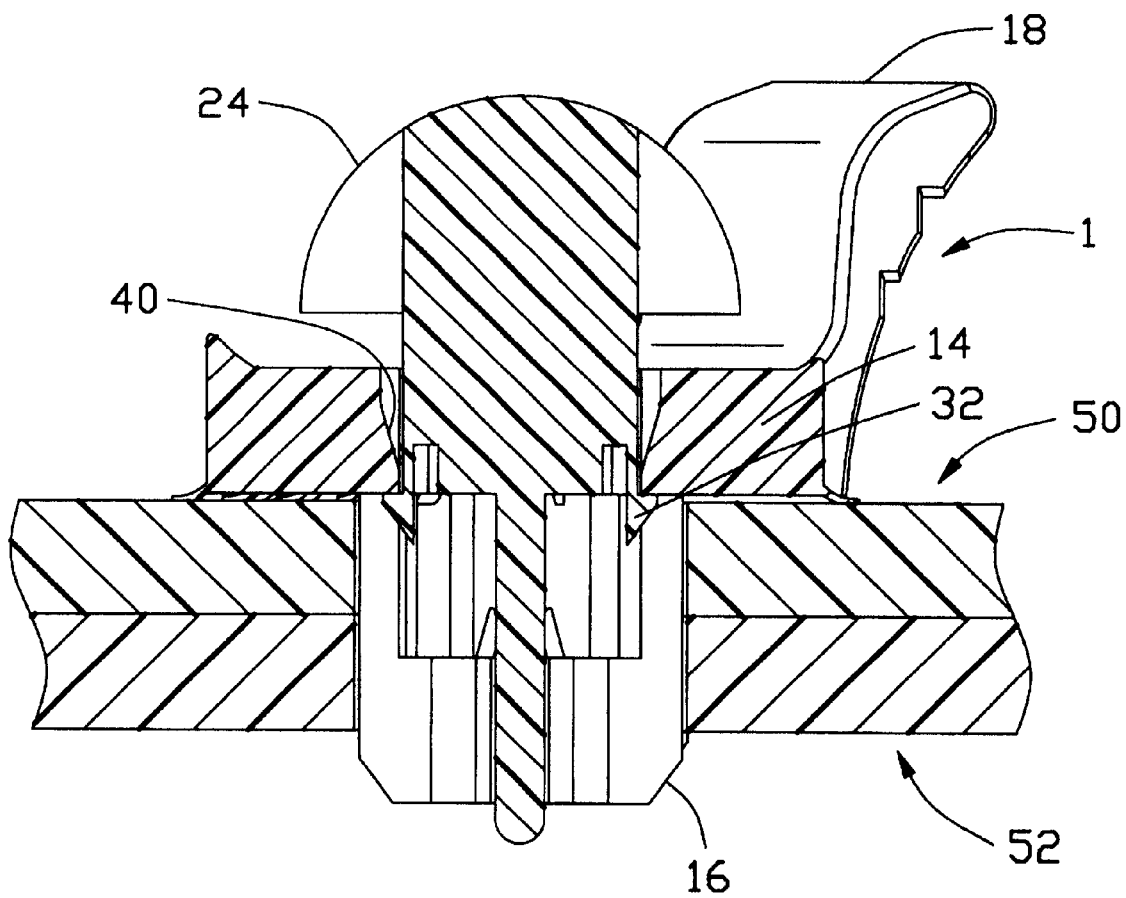
FIG. 7 is a cross-sectional view taken from line 7—7 of FIG. 4.
Figure 8:
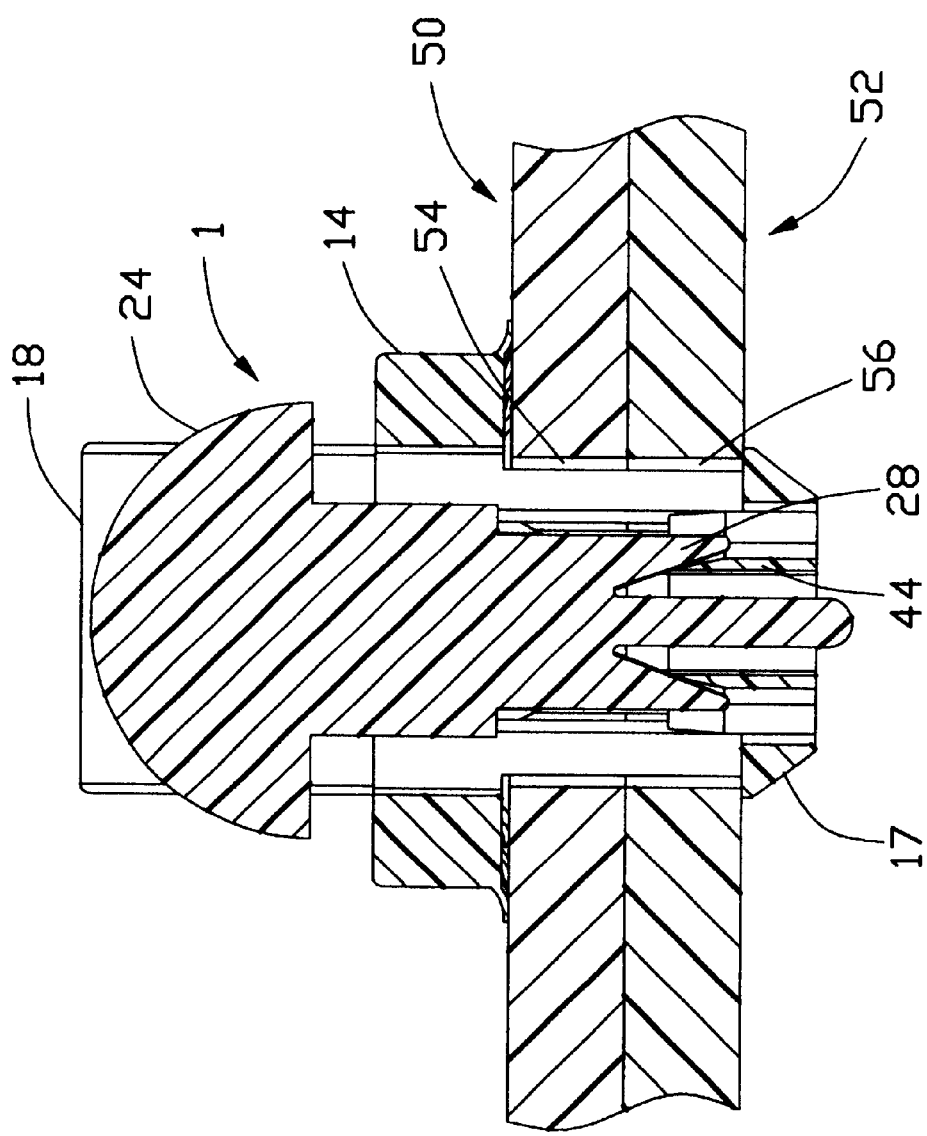
FIG. 8 is a cross-sectional view taken from line 8—8 of FIG. 4 wherein the two boards are joined together by the retention device.
Figure 9:
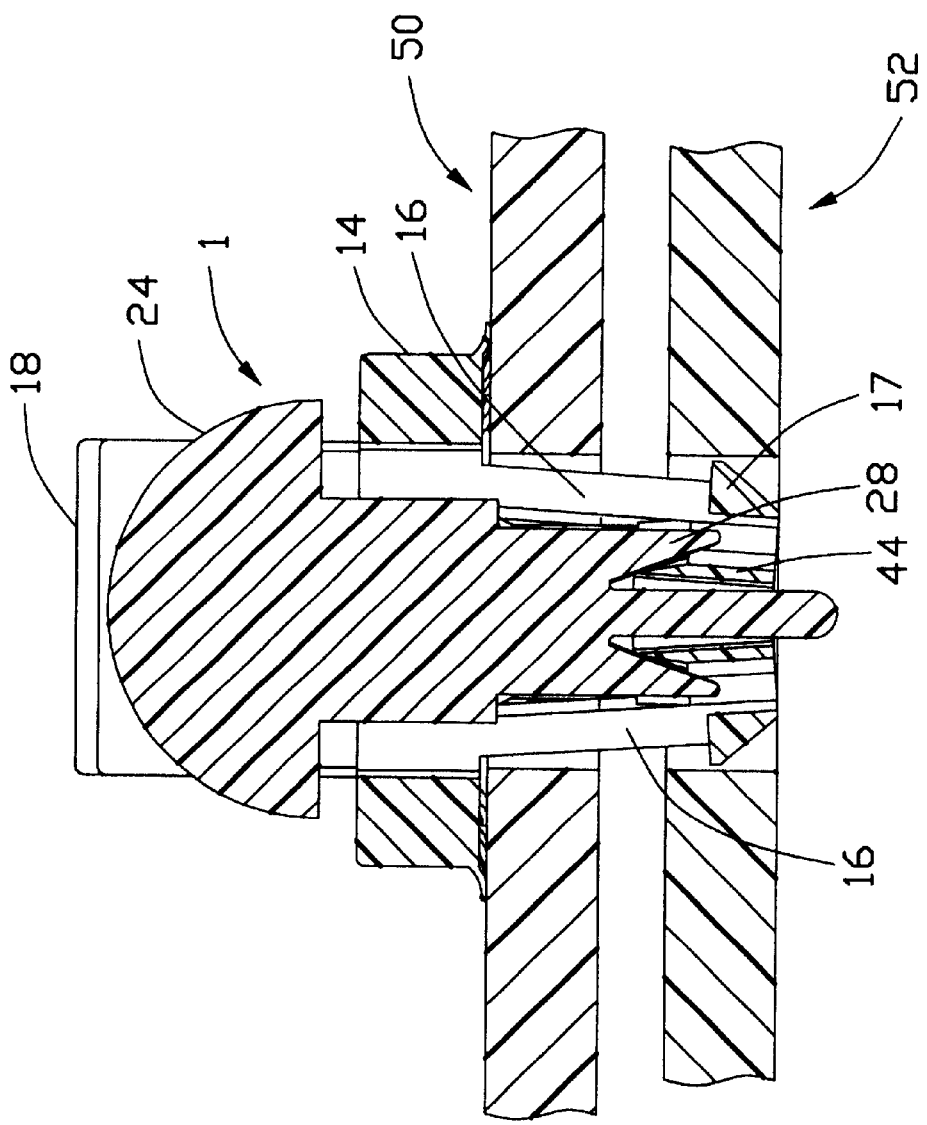
FIG. 9 is a view similar to FIG. 8 except that the retention device is operated to disengage the two boards from each other.

Referring to FIGS. 3–8 and particularly to FIGS. 7 and 8, the retention device 1 is used to join two elements 50, 52, for example a first and a second boards, together. After inserting the elastic latches 16 into holes 54, 56 of the boards 50, 52, the base portion 14 of the first element 10 resides on the first board 50 and the hooks 17 engage a bottom face of the second board 52, thereby joining the first and the second boards 50, 52 together.

To join the boards 50, 52 together by the retention device 1, the second member 12 is pushed into the opening 20 of the first member 10 by exerting an external force on the button 20. The wedge portions 28 drive the inner portions 44 and thus the elastic latches 16 to move inwardly to reach a position in which the hooks 17 of the elastic latches 16 no longer engage with peripheral walls of the holes 54, 56 in the boards 50, 52. Then the external force is removed from the button 24, the elastic latches 16 expand and the hooks 17 engages with the bottom face of the second board 52, and the second member 12 moves upwardly because of the pushing force of the inner portion 44 acting on the wedge portions 28. Of cause, the elastic latches 16 of the first member can also be simply inserted into the holes 54, 56 of the boards 50, 52 without pushing the second member 12 because of the elasticity of the elastic latches 16. When the second member 12 is pushed downwardly again, the wedge portions 28 drive the elastic latches 16 to move inwardly whereby the engagement between the hooks 17 of the first member 10 and the second board 52 is released. When the hooks 17 are disengaged from the second member, the retention device 1 can be separated from the first board 50 by pulling the wings 18 in a direction away from the first board 50.

Comparing with the prior art, a first advantage of this invention is that it is very convenient to attach the retention device 1 to and disengage it from the boards 50, 52. A second advantage is that the cost of the retention device is very low because it needs only injecting melted plastic into a mold or die, which is very adaptive for mass production.

The retention device 1 can be used to fasten to any devices or join any two or more devices together as long as these devices have an opening for receiving a part of the retention device 1. For example, the retention device 1 can join two separate printed circuit boards together as well as two separate metal sheets. The retention device 1 can also be used to retain a card, module or connector to a printed circuit board. All these usages should be considered as disclosure of this application.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retention device comprising:

a first member having a base portion and at least two elastic latches extending from the base portion in a predetermined direction, each elastic latch having a hook adapted for engaging with an element to which the first member is adapted to be fastened, the base portion defining an opening therethrough; and a second member received in the opening of the base and being movable back and forth in the predetermined direction, at least one of the second member and the elastic latches of the first member having an inclined surface, when the second member is inserted toward the hooks, the inclined surface engaging with a surface of the other one of the second member and the elastic latches of the first member to cause the elastic latches and the hooks to move inwardly;

wherein each elastic latch includes an inner portion connecting the hook and the second member includes at least two wedge portions located in accordance with the at least two elastic latches, when the second member is pushed into the opening the wedge portions driving the inner portion to move inwardly;

wherein the second member includes at least two hooks engageable with the base portion of the first member to avoid the second member from disengaging from the first member;

wherein the second member includes a button above the base portion of the first member on which external force is exerted to push the second member to disengage the elastic latches of the first member from the element to which the retention device is fastened.

2. The retention device as claimed in claim 1, wherein the base portion of the first member defines at least two slanted surfaces in accordance with the at least two hooks of the second member for facilitating insertion of the at least two hooks into the opening of the base portion of the first member.

3. The retention device as claimed in claim 1, wherein the second member defines one or more notches and the base portion of the first member includes a corresponding number of keys received in the corresponding notches to ensure that the second member is received in a correct position of the first member.

4. The retention device as claimed in claim 1, wherein the first member includes a pair of wings extending from the base portion thereof in a direction away from the elastic latches thereof for facilitating removing the retention device from the element to which it is fastened.

5. A removeable snap-in retention arrangement comprising:
- a first element defining a first hole;
- a second element stacked upon the first element and defining a second hole in axial alignment with said first hole; a retention device including a primary member for retaining the first element and the second element together, said primary member including a base portion generally located above the second element, and hooks located under the first element, said base portion cooperating with said hooks to restrain said first element and said second element from being withdrawn from each other; and
- said retention device further including a secondary member for separating said first element and said second element from each other; wherein
- said secondary member is essentially constantly retainably associated with said primary member regardless of whether said first and second elements are retained together or separated from each other, and is moveable relative to the primary member along an axial direction of said aligned first and second holes, by an imposed force, from an original position to an operation position to have the hooks inwardly move radially perpendicular to said axial direction from outer locking positions so as to disengage the first element from the hooks and separate the first element from the second element;
- wherein said secondary member automatically/recoverably returns from the operation position to the original position relative to the primary member after said imposed force is removed and the hooks return to locking positions.

6. The arrangement as claimed in claim 5, wherein a portion of said secondary member is inserted into the first member.

7. The arrangement as claimed in claim 6, wherein another portion of said secondary member is exposed above the second element for easy accessible operation.

8. The arrangement as claimed in claim 5, wherein the primary member is in a relaxed manner when said hooks are located in the outer locking positions.

9. The arrangement as claimed in claim 5, wherein said hooks are formed on corresponding latches extending downwardly from said base portion and through both said first and second holes.

10. The arrangement as claimed in 5, wherein said secondary member includes hooks to retain the secondary member to the primary member at the original position without being withdrawn from the primary member in a first direction.

11. The arrangement as claimed in claim 10, further including means for allowing the secondary member to move from the original position to the operation position in a second direction opposite to said first direction when said imposed force exists while also to resume from the operation position to the original position in the first direction when said imposed force disappears.

12. The arrangement as claimed in claim 11, wherein said second direction is parallel with said axial direction.

* * * * *